US012785172B2

(12) United States Patent
West et al.

(10) Patent No.: US 12,785,172 B2
(45) Date of Patent: Nov. 3, 2026

(54) BATTERY PACK INCLUDING BUSBAR FRAME CONFIGURED AS COOLANT MANIFOLD

(71) Applicant: Ford Global Technologies, LLC, Dearborn, MI (US)

(72) Inventors: Liam E. West, Ferndale, MI (US); Nathan Lee, Novi, MI (US); Wen Dai, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 870 days.

(21) Appl. No.: 18/095,692

(22) Filed: Jan. 11, 2023

(65) Prior Publication Data

US 2024/0234868 A1 Jul. 11, 2024

(51) Int. Cl.

| | |
|---|---|
| ***H01M 10/6568*** | (2014.01) |
| ***H01M 10/613*** | (2014.01) |
| ***H01M 10/625*** | (2014.01) |
| ***H01M 50/209*** | (2021.01) |
| ***H01M 50/507*** | (2021.01) |

(52) U.S. Cl.

CPC ..... *H01M 10/6568* (2015.04); *H01M 10/613* (2015.04); *H01M 10/625* (2015.04); *H01M 50/209* (2021.01); *H01M 50/507* (2021.01); *H01M 2220/20* (2013.01)

(58) Field of Classification Search

CPC ........... H01M 10/6568; H01M 10/613; H01M 10/625; H01M 50/209; H01M 50/507; H01M 2220/20; H01M 10/6556; H01M 50/505; H01M 10/6567; Y02E 60/10

See application file for complete search history.

(56) References Cited

U.S. PATENT DOCUMENTS

| | | | | |
|---|---|---|---|---|
| 5,158,841 A | 10/1992 | Mennicke et al. | | |
| 6,566,004 B1 | 5/2003 | Fly et al. | | |
| 8,530,069 B2 | 9/2013 | Wood et al. | | |
| 9,919,608 B2 | 3/2018 | Wang et al. | | |
| 10,000,126 B2 | 6/2018 | Lei et al. | | |
| 2013/0143093 A1* | 6/2013 | Teng | ................... | H01M 10/651 429/120 |
| 2016/0190663 A1* | 6/2016 | Bahrami | ............. | H01M 10/613 429/120 |
| 2022/0359929 A1* | 11/2022 | Kim | .................... | H01M 10/647 |

FOREIGN PATENT DOCUMENTS

| | | |
|---|---|---|
| CN | 210866420 U | 6/2020 |
| CN | 107039703 B | 11/2021 |
| CN | 114175360 A | 3/2022 |
| DE | 102012220537 B4 | 1/2022 |

* cited by examiner

*Primary Examiner* — Matthew T Martin
*Assistant Examiner* — Kevin Song
(74) *Attorney, Agent, or Firm* — David B. Kelley; Carlson, Gaskey & Olds, P.C.

(57) ABSTRACT

This disclosure relates generally to battery packs for electrified vehicles, and in particular relates to a battery pack including a busbar frame configured as a coolant manifold. In some aspects, the techniques described herein relate to a battery pack, including: a battery array, wherein the battery array includes a plurality of battery cells and at least one busbar; and a busbar frame configured to support the at least one busbar, wherein the busbar frame includes an internal channel configured to communicate a fluid to thermally condition the battery array.

14 Claims, 5 Drawing Sheets

BATTERY PACK INCLUDING BUSBAR FRAME CONFIGURED AS COOLANT MANIFOLD

TECHNICAL FIELD

This disclosure relates generally to battery packs for electrified vehicles, and in particular relates to a battery pack including a busbar frame configured as a coolant manifold.

BACKGROUND

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on an internal combustion engine to propel the vehicle.

A high voltage battery pack typically powers the electric machines and other electrical loads of the electrified vehicle. The battery pack includes a plurality of battery cells and various other battery internal components that support electric propulsion of electrified vehicles.

The battery cells generate heat during charging and discharging operations. This heat must be dissipated in order to achieve a desired level of battery performance. Heat exchanger plates, sometimes referred to as "cold plates," are often employed to dissipate the heat generated by the battery cells.

SUMMARY

In some aspects, the techniques described herein relate to a battery pack, including: a battery array, wherein the battery array includes a plurality of battery cells and at least one busbar; and a busbar frame configured to support the at least one busbar, wherein the busbar frame includes an internal channel configured to communicate a fluid to thermally condition the battery array.

In some aspects, the techniques described herein relate to a battery pack, wherein: the busbar frame is a first busbar frame arranged on a first side of the battery array, the battery pack includes a second busbar frame arranged on a second side of the battery array, and the second busbar frame includes an internal channel configured to communicate the fluid.

In some aspects, the techniques described herein relate to a battery pack, wherein the battery array is configured to permit fluid expelled from the first busbar frame to flow toward the second busbar frame.

In some aspects, the techniques described herein relate to a battery pack, wherein: the battery pack further includes an enclosure assembly including an inlet and an outlet, a first conduit assembly is configured to communicate fluid from the inlet to the internal channel of the first busbar frame, and a second conduit assembly is configured to communicate fluid from the internal channel of the second busbar frame to the outlet.

In some aspects, the techniques described herein relate to a battery pack, wherein: the battery array is a first battery array, a second battery array is within the enclosure assembly, the first battery array is vertically above the second battery array, a third busbar frame is arranged on a first side of the second battery array, a fourth busbar frame is arranged on a second side of the second battery array, and the third and fourth busbar frames include internal channels configured to communicate fluid.

In some aspects, the techniques described herein relate to a battery pack, wherein: the first conduit assembly is configured to communicate fluid from the inlet to the internal channels of the first and third busbar frames, and the second conduit assembly is configured to communicate fluid from the internal channels of the second and fourth busbar frames to the outlet.

In some aspects, the techniques described herein relate to a battery pack, wherein: the battery pack includes a plurality of thermal exchange plates arranged between some of the battery cells within the battery array, and the thermal exchange plates include channels configured to permit fluid to flow from the first busbar frame to the second busbar frame.

In some aspects, the techniques described herein relate to a battery pack, wherein: the internal channel of the first busbar frame includes a plurality of vertical sections aligned with the thermal exchange plates, and the vertical sections are configured to communicate fluid into the channels of the thermal exchange plates.

In some aspects, the techniques described herein relate to a battery pack, wherein the internal channel of the first busbar frame includes a plurality of connector sections configured to communicate fluid from an inlet of the first busbar frame to the plurality of vertical sections.

In some aspects, the techniques described herein relate to a battery pack, wherein: the internal channel of the second busbar frame includes a plurality of vertical sections aligned with the thermal exchange plates, and the vertical sections are configured to collect fluid expelled from the channels of the thermal exchange plates.

In some aspects, the techniques described herein relate to a battery pack, wherein the internal channel of the second busbar frame includes a plurality of connector sections configured to communicate fluid from the plurality of vertical sections to an outlet of the second busbar frame.

In some aspects, the techniques described herein relate to a battery pack, wherein the battery array is configured such that fluid expelled from the first busbar frame flows toward the second busbar frame through a void above or below one of the battery cells.

In some aspects, the techniques described herein relate to a method, including: communicating fluid through a busbar frame of a battery pack to thermally condition a battery array.

In some aspects, the techniques described herein relate to a method, wherein the busbar frame is a first busbar frame, and further including: communicating fluid through a second busbar frame on an opposite side of the battery array as the first busbar frame.

In some aspects, the techniques described herein relate to a method, further including: communicating fluid expelled from the first busbar frame through a thermal exchange plate.

In some aspects, the techniques described herein relate to a method, wherein the thermal exchange plate includes channels configured to permit fluid to flow from the first busbar frame to the second busbar frame.

In some aspects, the techniques described herein relate to a method, wherein: an internal channel of the first busbar frame includes a plurality of vertical sections aligned with the thermal exchange plate, and the vertical sections are configured to communicate fluid into the channels of the thermal exchange plate.

In some aspects, the techniques described herein relate to a method, wherein the internal channel of the first busbar frame includes a plurality of connector sections configured to communicate fluid from an inlet of the first busbar frame to the plurality of vertical sections.

In some aspects, the techniques described herein relate to a method, wherein: an internal channel of the second busbar frame includes a plurality of vertical sections aligned with the thermal exchange plates, and the vertical sections are configured to collect fluid expelled from the channels of the thermal exchange plates.

In some aspects, the techniques described herein relate to a method, wherein the internal channel of the second busbar frame includes a plurality of connector sections configured to communicate fluid from the plurality of vertical sections to an outlet of the second busbar frame.

DETAILED DESCRIPTION

This disclosure relates generally to battery packs for electrified vehicles, and in particular relates to a battery pack including a busbar frame configured as a coolant manifold. Among other benefits, which will be appreciated from the below description, this disclosure evenly distributes coolant relative to the cells of a battery array, which provides uniform heat transfer amongst the cells and leads to efficient heat transfer within the battery array.

Figure 1:
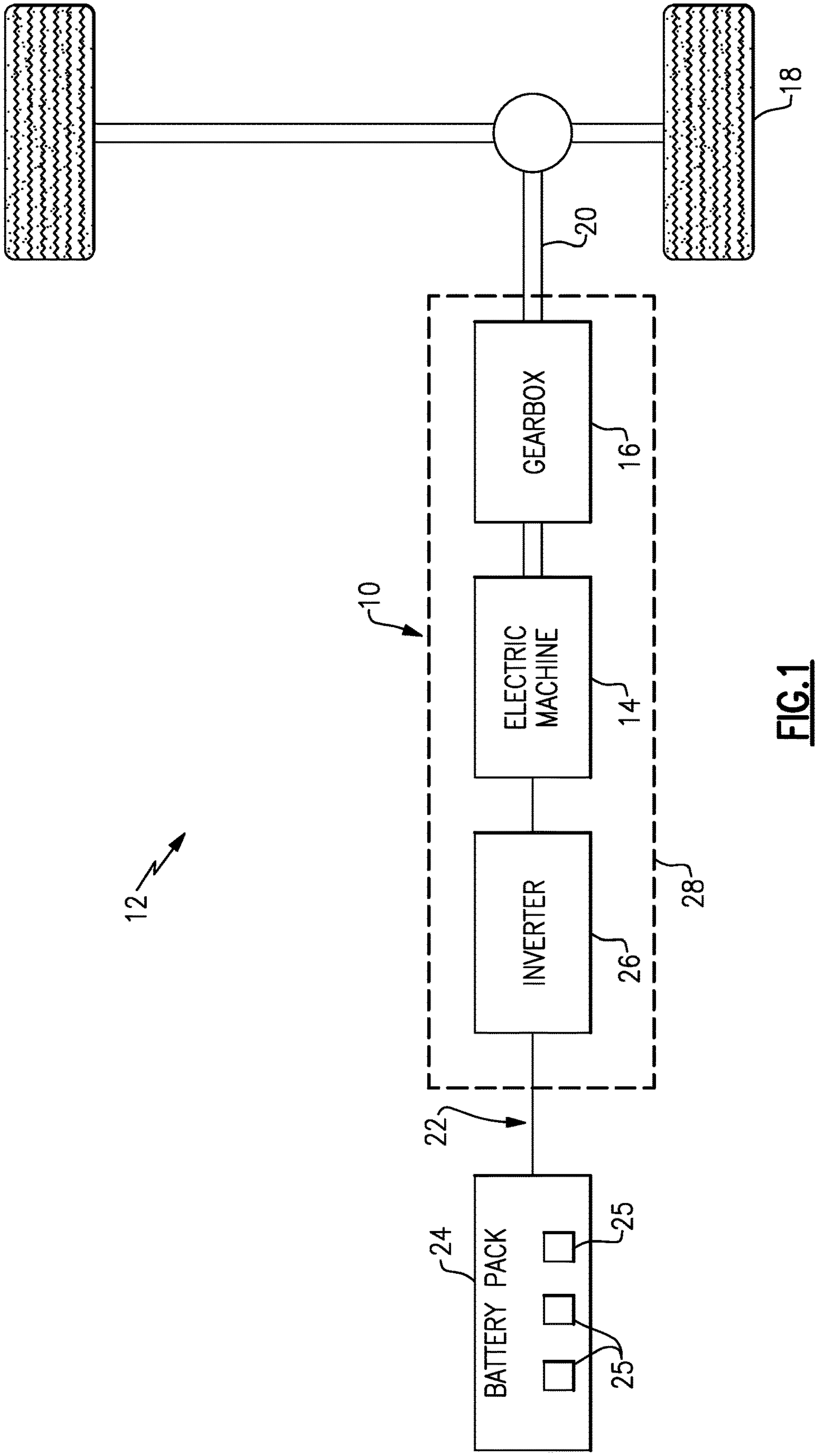
FIG. 1 schematically illustrates an example powertrain of an electrified vehicle.

FIG. 1 schematically illustrates a powertrain 10 of an electrified vehicle 12. Although depicted as a battery electric vehicle (BEV), it should be understood that the concepts described herein are not limited to BEVs and could extend to other electrified vehicles, including but not limited to, plug-in hybrid electric vehicles (PHEVs). Therefore, although not shown in this embodiment, the electrified vehicle 12 could be equipped with an internal combustion engine that can be employed in combination with other energy sources to propel the electrified vehicle 12.

In a non-limiting embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 may collectively be referred to as a transmission 28.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The powertrain 10 shown in FIG. 1 is highly schematic and is not intended to limit this disclosure. Various additional components could alternatively or additionally be employed by the powertrain 10 within the scope of this disclosure.

Figure 2:
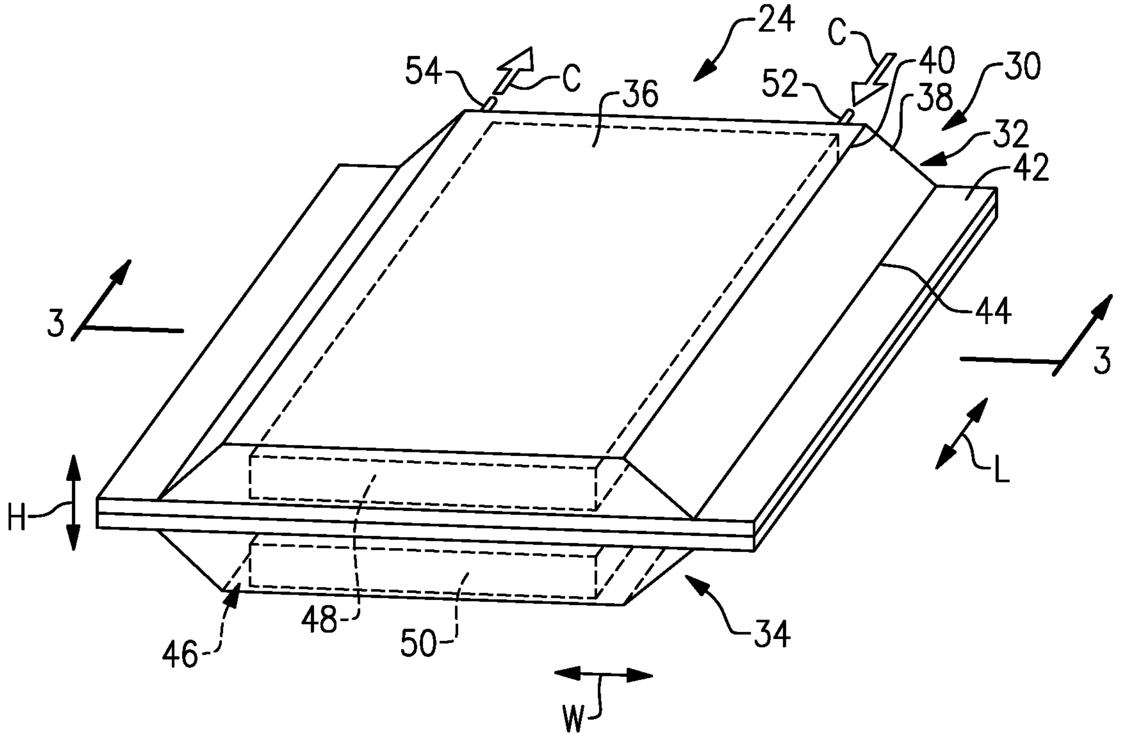
FIG. 2 is a perspective view of an example battery pack.

FIG. 2 illustrates additional detail of the example battery pack 24. In this example, the battery pack 24 includes an enclosure assembly 30. The enclosure assembly 30 includes a first portion 32, which here is a top portion or cover, and a second portion 34, which here is a bottom portion or tray. While the first portion 32 is vertically above the second portion 34, in this example, the first portion 32 could be arranged below, or to a side of the second portion 34. Various terms such as "above," "below," "top," and "bottom" are used relative to the arrangement of the battery pack 24 in the various drawings and should not otherwise be deemed limiting.

In this example, the first portion 32 includes a substantially planar main section 36, an angled section 38 projecting toward the second portion 34 from an edge 40 of the main section 36 at a non-perpendicular angle relative to the main section 36, and a rim 42 projecting outward from an edge 44 of the angled section 38. The rim 42 is substantially parallel to the main section 36. The first portion 32 exhibits this arrangement about an entire perimeter of the first portion 32, in this example. The second portion 34 is sized and shaped substantially similar to the first portion 32. The first and second portions 32, 34 may be formed of a metallic material using a stamping process, for example.

The first and second portions 32, 34 are welded to one another by welding the respective rims 42 to one another. While welding is mentioned, the first and second portions 32, 34 could be connected using other fluid-tight connection techniques, such as using adhesive. Further, while an exemplary enclosure assembly 30 is shown in the drawings, the enclosure assembly 30 may vary in size, shape, and configuration within the scope of this disclosure.

The enclosure assembly 30 exhibits a length L, width W, and height H. The length L may extend parallel to a centerline of the electrified vehicle 12. The width W may extend substantially across an entire width of the electrified vehicle 12.

Figure 3:
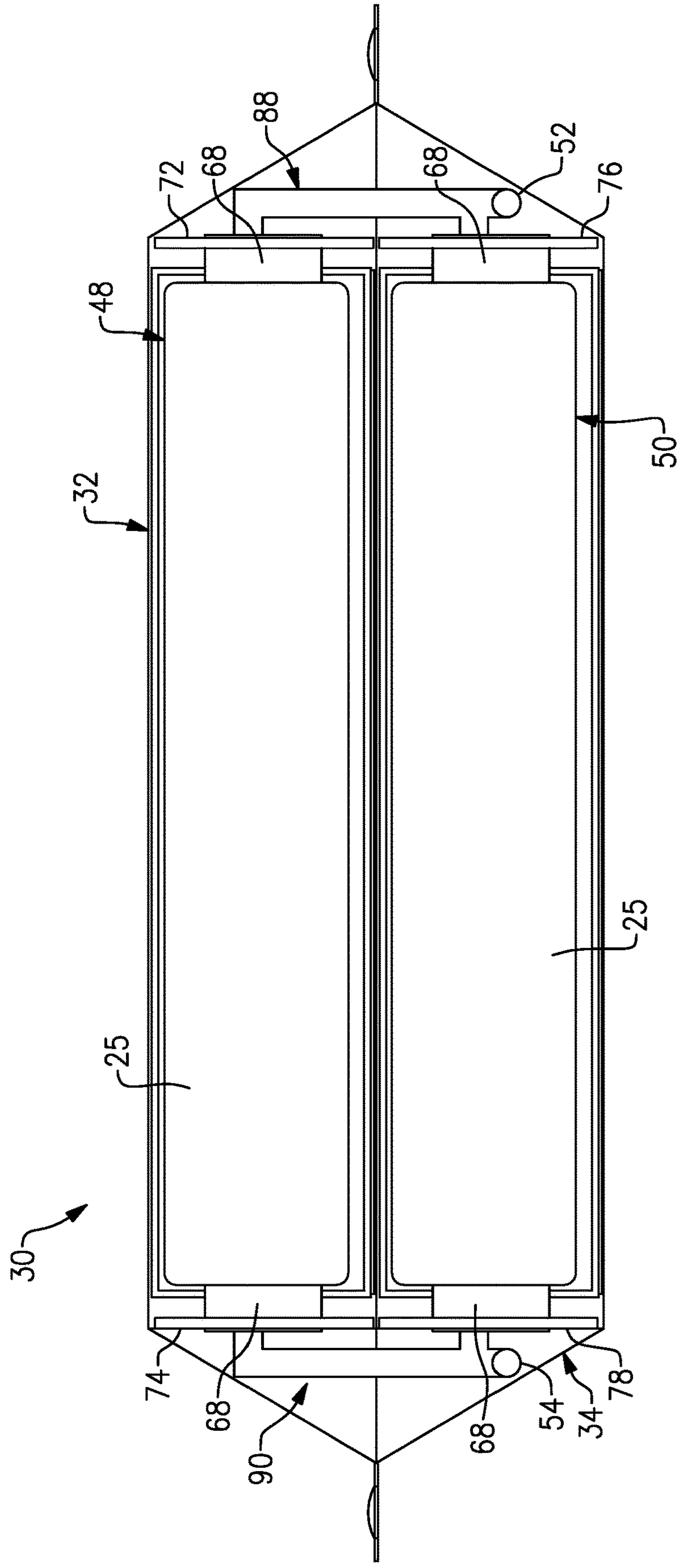
FIG. 3 is a cross-sectional view of the example battery pack, taken along line 3-3 from FIG. 2, and illustrates an example arrangement of battery arrays and busbar frames.

With joint reference to FIGS. 2 and 3, the enclosure assembly 30 defines a volume 46, which is specifically an inner volume of the enclosure assembly 30. Within the volume 46, the enclosure assembly 30 encloses a first battery array 48 and a second battery array 50 vertically below the first battery array 48. While two battery arrays are shown, this disclosure extends to battery packs with one or more arrays.

The battery pack 24 is configured to direct non-conductive coolant C relative to the first and second battery arrays 48, 50 to thermally condition the first and second battery arrays 48, 50, such as by absorbing heat from the first and second battery arrays 48, 50. The enclosure assembly 30 includes an inlet 52 on a first side of the first and second battery arrays 48, 50, and an outlet 54 on a second side of the first and second battery arrays 48, 50. Various fluid couplings may be provided relative to the inlet 52 and outlet 54. The coolant C may be referred to as thermal exchange fluid.

Figure 4:
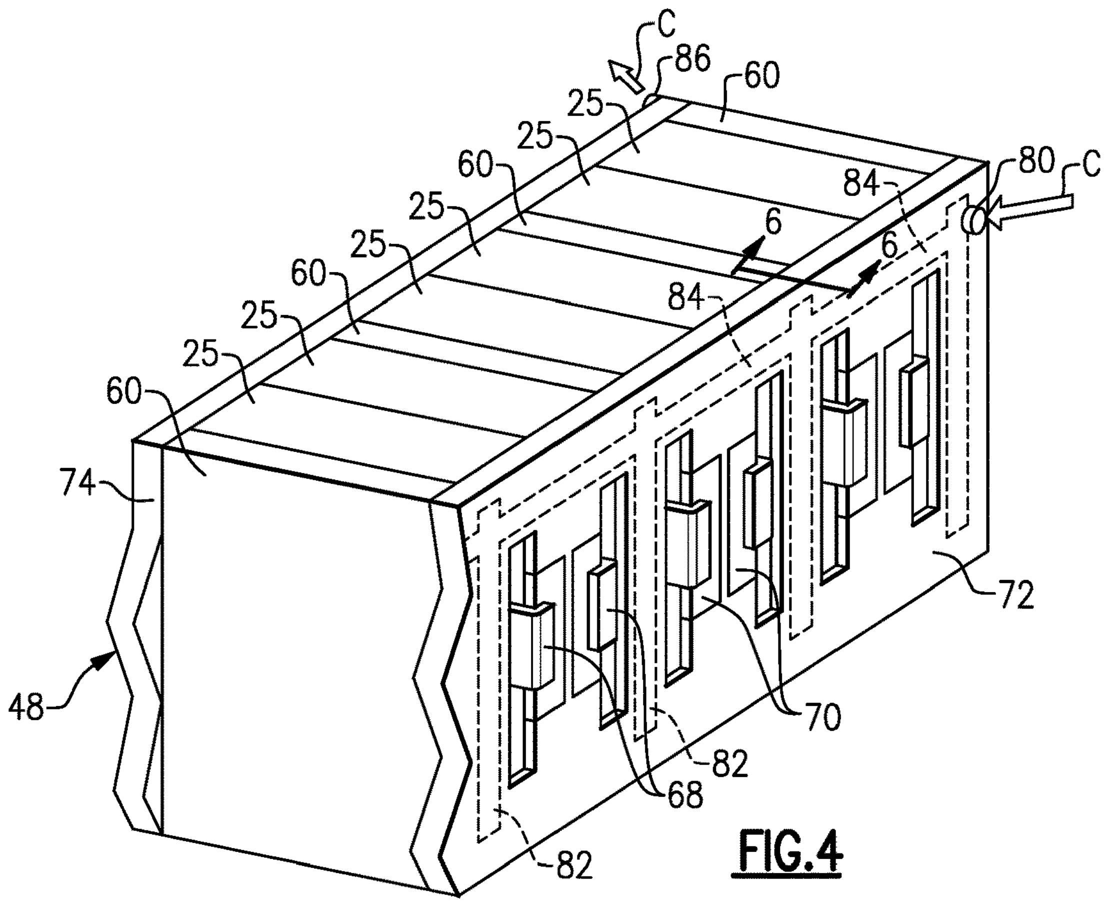
FIG. 4 is a perspective view of a portion of a battery array relative to two busbar frames.

In this disclosure, the first and second battery arrays 48, 50 of battery cells 25 are generally stacked face-to-face, as shown in FIG. 4. The battery pack 24 could employ any number of battery cells 25 within the scope of this disclosure. As shown in FIG. 4, in one example, every two battery cells 25 are spaced-apart by a thermal exchange plate 60. The thermal exchange plates 60 may be considered part of the first battery array 48.

Figure 5:
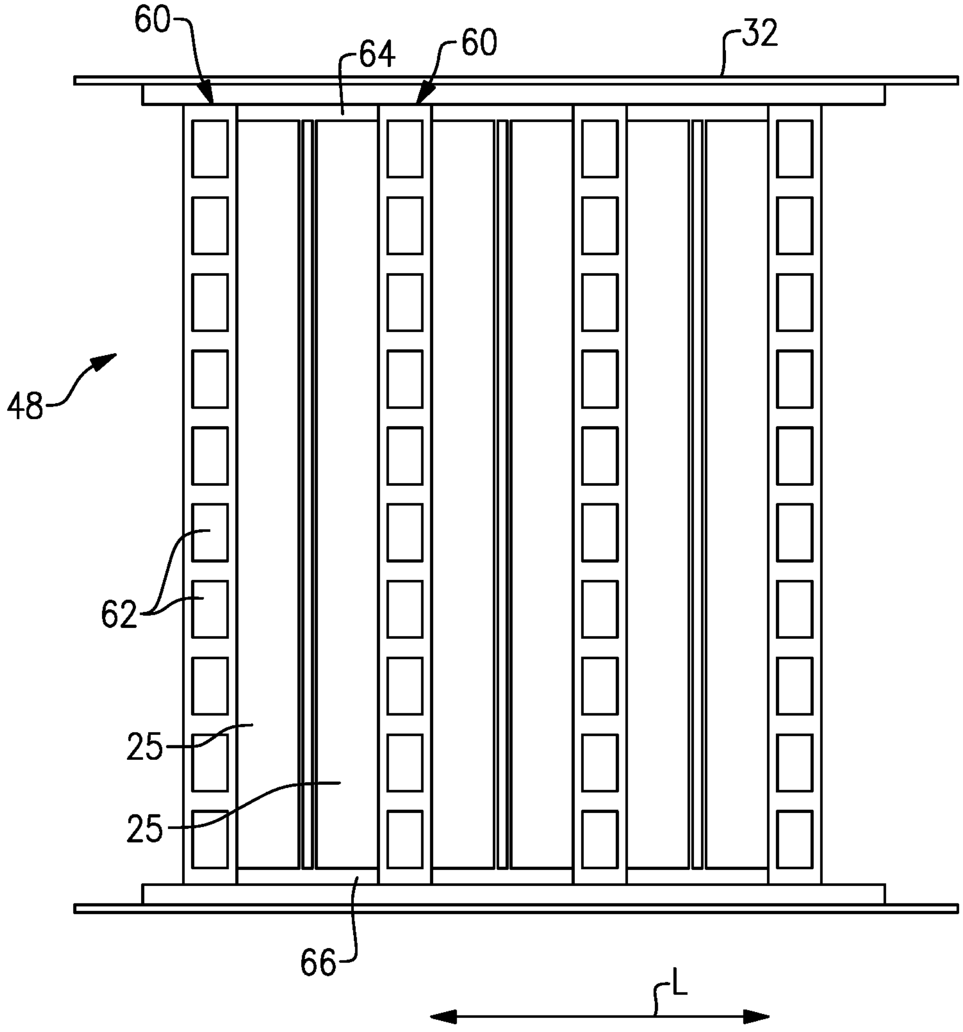
FIG. 5 is a side view of a portion of the battery pack and illustrates an exemplary arrangement of the battery cells relative to thermal exchange plates.

With reference to FIG. 5, each of the thermal exchange plates 60 includes a plurality of channels 62 configured to communicate coolant C from one side of the first battery array 48 to the other. Further, the battery cells 25 are arranged relative to the thermal exchange plates 60, in this example, such that voids 64, 66 are provided above and below the battery cells 25. The voids 64, 66 are also configured to communicate coolant C. The voids 64, 66 are not present in all examples.

In an embodiment, the battery cells 25 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

With reference to FIG. 4, each of the battery cells 25 includes tabs 68 electrically connected to a corresponding busbar 70 adjacent a side of the battery cells 25. Each of the busbars 70 is mounted to a busbar frame 72, in this example. Each of the battery cells 25 includes two tabs, in this example, with each tab projecting from an opposite side of each of the battery cells 25. As such, a busbar frame 74 and corresponding arrangement of busbars is provided on an opposite side of the battery cells 25.

While FIG. 4 only shows a portion of the first battery array 48, the second battery array 50 is arranged similarly and includes busbar frames 76, 78 on opposite sides thereof (FIG. 3). Together, the battery pack 24 includes first, second, third and fourth busbar frames 72, 74, 76, 78, respectively. The detail of the first busbar frame 72 will now be described. The second, third and fourth busbar frames 74, 76, 78 are configured substantially similarly.

Figure 6:
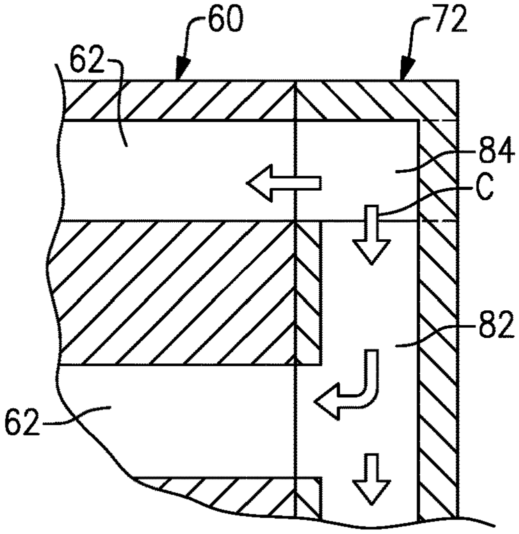
FIG. 6 is a cross-sectional view taken along line 6-6 from FIG. 4 and illustrates additional detail of an arrangement of a busbar frame relative to a thermal exchange plate.

With reference to FIGS. 4 and 6, the first busbar frame 72 includes at least one internal channel configured to fluid, namely coolant C, to thermally condition the first battery array 48. In this example, the internal channel(s) of the first busbar frame 72 are configured such that the first busbar frame 72 acts as a manifold distributing coolant C relative to the first battery array 48, in addition to supporting the busbars 70. Specifically, in this example, the first busbar frame 72 is configured to distribute coolant C relative to the thermal exchange plates 60. By forming the first busbar frame 72, and other busbar frames, such that they can act as manifolds, coolant is readily distributed within the battery pack 24 using an existing structure.

With continued reference to FIGS. 4 and 6, the first busbar frame 72 includes an inlet port 80 configured to permit coolant C to enter the internal channel of the first busbar frame 72. In one example, the first busbar frame 72 includes an internal channel including a plurality of a plurality of vertical sections 82 and a plurality of connector sections 84. In this example, the vertical sections 82 extend in a direction parallel to the height H of the enclosure assembly 30, while the connector sections 84 extend in a direction parallel to the length L. The second, third, and fourth busbar frames 74, 76, 78 include a substantially similar arrangement of internal channels.

The internal channels can be formed using known techniques. In an example, each busbar frame 72, 74, 76, 78 is formed of multiple metallic plates, with the internal channels formed by machining grooves in one of the plates and another plate covering the grooves to establish the internal channels. The busbar frames 72, 74, 76, 78 can be formed using molding, casting, or additive manufacturing techniques, as examples.

Coolant C entering the inlet port 80 flows through the connector sections 84 to the vertical sections 82. The vertical sections 82 are aligned with the channels 62 relative to a length L of the enclosure assembly 30, in this example. Further, as shown in FIGS. 4 and 6, the vertical sections 82 are in communication with the channels 62 of the thermal exchange plates 60 such that coolant C can flow from the vertical sections 82 and into the channels 62. Coolant C then flows through the thermal exchange plates 60 and absorbs heat from the first battery array 48. Coolant C expelled from the thermal exchange plates 60 enters a corresponding vertical section of an internal channel of the second busbar frame 74, where that coolant C is collected, and then that coolant C is directed to an outlet port 86 of the second busbar frame 74 by connector sections of the internal channel of the second busbar frame 74.

In this example, the busbar frames directly contact the thermal exchange plate 60. Alternatively, one or more seals or gaskets may be provided between the thermal exchange plate 60 and the busbar frames, such that the busbar frames indirectly contact the thermal exchange plate 60 via the seal/gasket.

While the first busbar frame 72 is shown and described as communicating coolant C into the channels 62, this disclosure encompasses busbar frames that direct coolant into voids 64, 66 in addition to or as an alternative to directing fluid though channels of a thermal exchange plate.

The battery pack 24, in an example of this disclosure, includes a first conduit assembly 88 configured to direct coolant C from the inlet 52 to the inlet ports of the first and third busbar frames 72, 76, as shown in FIG. 3. Further, a second conduit assembly 90 is configured to direct coolant C from the outlet ports of the second and fourth busbar frames 74, 78 to the outlet 54. The conduit assemblies 88, 90 may each include one or more hoses and pipes, etc., and those hoses/pipes may further include various valves, fittings, couplings, etc., to establish the above-described connections.

The coolant C may be a non-conductive coolant C, such as a dielectric fluid designed for immersion cooling the battery cells 25. One suitable non-conductive fluid is a Novek™ engineered fluid sold by 3M™. However, other non-conductive fluids may also be suitable, and the actual chemical make-up and design characteristics (e.g., dielectric constant, maximum breakdown strength, boiling point, etc.) may vary depending on the environment the array 48 is to be employed within. Unlike the conductive glycol utilized within known cold plate systems, the non-conductive fluid received inside the immersion cooled battery arrays of this disclosure allows for direct contact with the battery cells and other electrified components without causing electrical shorts, thereby improving cooling and performance. The exemplary immersion cooling strategies further enable high rate charging and discharging and allow for high load demands without increasing the hardware size of the battery arrays.

It should be understood that terms such as "about," "substantially," and "generally" are not intended to be boundaryless terms, and should be interpreted consistent with the way one skilled in the art would interpret those terms. It should also be understood that directional terms such as "upper," "top," "vertical," "forward," "rear," "side," "above," "below," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A battery pack, comprising:

a battery array, wherein the battery array includes a plurality of battery cells and at least one busbar; and a busbar frame configured to support the at least one busbar, wherein the busbar frame includes an internal channel configured to communicate a fluid to thermally condition the battery array, wherein the busbar frame is a first busbar frame arranged on a first side of the battery array, wherein the battery pack includes a second busbar frame arranged on a second side of the battery array opposite the first side of the battery array, wherein the second busbar frame includes an internal channel configured to communicate the fluid downstream of the first busbar frame, wherein the battery pack includes a plurality of thermal exchange plates arranged between some of the battery cells within the battery array, and wherein the thermal exchange plates include channels configured to permit fluid to flow from the first busbar frame, through the thermal exchange plates, and to the second busbar frame, wherein: the internal channel of the first busbar frame includes a plurality of vertical sections aligned with the thermal exchange plates relative to a length of the battery pack, and the vertical sections are configured to communicate fluid into the channels of the thermal exchange plates.

2. The battery pack as recited in claim 1, wherein the battery array is configured to permit fluid expelled from the first busbar frame to flow through laterally-extending channels of the thermal exchange plates toward the second busbar frame.

3. The battery pack as recited in claim 1, wherein:

the battery pack further includes an enclosure assembly including an inlet and an outlet, a first conduit assembly is configured to communicate fluid from the inlet to the internal channel of the first busbar frame, and a second conduit assembly is configured to communicate fluid from the internal channel of the second busbar frame to the outlet.

4. The battery pack as recited in claim 3, wherein:

the battery array is a first battery array, a second battery array is within the enclosure assembly, the first battery array is vertically above the second battery array, a third busbar frame is arranged on a first side of the second battery array, a fourth busbar frame is arranged on a second side of the second battery array, and the third and fourth busbar frames include internal channels configured to communicate fluid.

5. The battery pack as recited in claim 4, wherein:

the first conduit assembly is configured to communicate fluid from the inlet to the internal channels of the first and third busbar frames, and the second conduit assembly is configured to communicate fluid from the internal channels of the second and fourth busbar frames to the outlet.

6. The battery pack as recited in claim 1, wherein the internal channel of the first busbar frame includes a plurality of connector sections configured to communicate fluid from an inlet of the first busbar frame to the plurality of vertical sections.

7. The battery pack as recited in claim 1, wherein:

the internal channel of the second busbar frame includes a plurality of vertical sections aligned with the thermal exchange plates relative to the length of the battery pack, and the vertical sections are configured to collect fluid expelled from the channels of the thermal exchange plates.

8. The battery pack as recited in claim 7, wherein the internal channel of the second busbar frame includes a plurality of connector sections configured to communicate fluid from the plurality of vertical sections to an outlet of the second busbar frame.

9. The battery pack as recited in claim 1, wherein the battery array is configured such that some fluid expelled from the first busbar frame flows toward the second busbar frame through a void above or below one of the battery cells.

10. The battery pack as recited in claim 8, wherein the plurality of vertical sections of the first and second busbar frames extend from a respective connector section in a direction parallel to a height of the battery pack, and wherein the connector sections of the first and second busbar frames extend in a direction parallel to a length of the battery pack.

11. The battery pack as recited in claim 10, wherein:

the first busbar frame includes a first through-opening between two of the vertical sections of the first busbar frame, a first busbar is supported adjacent the first through-opening, and a first tab of a cell of the battery array projects through the first through-opening and interfaces with the first busbar on a side of the first busbar frame facing away from the battery array.

12. The battery pack as recited in claim 11, wherein:

the second busbar frame includes a second through-opening between two of the vertical sections of the second busbar frame, a second busbar is supported adjacent the second through-opening, and a second tab of the cell of the battery array projects through the second through-opening and interfaces with the second busbar on a side of the second busbar frame facing away from the battery array.

13. The battery pack as recited in claim 1, wherein the internal channels of the first and second busbar frames are configured to communicate the fluid without the fluid flowing through the at least one busbar.

14. The battery pack as recited in claim 1, wherein:

the first busbar frame is arranged on a first lateral side of the battery array, the second busbar frame is arranged on a second lateral side of the battery array opposite the first lateral side, and the channels of the thermal exchange plates extend laterally across the battery array to fluidly connect the internal channel of the first busbar frame to the internal channel of the second busbar frame.

* * * * *